(12) United States Patent
Inoue (10) Patent No.: US 8,511,247 B2
(45) Date of Patent: Aug. 20, 2013

(54) UNDERWATER TRAVELING VEHICLE (75) Inventor: Tomoya Inoue, Yokosuka (JP)

(73) Assignee: Japan Agency for Marine-Earth Science & Technology, Yokosuka-shi, Kanagawa (JP)

( * ) Notice: Subject to any disclaimer, the term of this patent is extended or adjusted under 35 U.S.C. 154(b) by 86 days.

(21) Appl. No.: 13/003,686

(22) PCT Filed: Jul. 7, 2009

(86) PCT No.: PCT/JP2009/062346
§ 371 (c)(1),
(2), (4) Date: Jan. 11, 2011

(87) PCT Pub. No.: WO2010/007914
PCT Pub. Date: Jan. 21, 2010

(65) Prior Publication Data
US 2011/0107955 A1    May 12, 2011

(30) Foreign Application Priority Data

Jul. 17, 2008 (JP) ................ 2008-186046

(51) Int. Cl.
*B63H 19/08* (2006.01)
*B63G 8/08* (2006.01)

(52) U.S. Cl.
USPC ................ 114/337; 440/12.56

(58) Field of Classification Search
USPC ................ 440/12.56; 114/337
See application file for complete search history.

(56) References Cited

U.S. PATENT DOCUMENTS

| 3,168,261 | A | * | 2/1965 | Hainer | 242/390.6 |
| 3,765,367 | A | * | 10/1973 | Hendrickson et al. | 440/12.56 |
| 4,170,954 | A | * | 10/1979 | Rinaldi | 114/265 |
| 4,673,370 | A | * | 6/1987 | Goldfarb et al. | 446/162 |
| 5,328,250 | A | * | 7/1994 | Upright | 299/8 |
| 2004/0089090 | A1 | * | 5/2004 | Maeda | 74/490.01 |

FOREIGN PATENT DOCUMENTS

| JP | 8-116826 A | 5/1996 |
| JP | 9-058583 A | 3/1997 |
| JP | 2003-025265 A | 1/2003 |

OTHER PUBLICATIONS

International Search Report of PCT/JP2009/062346, mailing date Oct. 13, 2009.

* cited by examiner

*Primary Examiner* — Stephen Avila
(74) *Attorney, Agent, or Firm* — Westerman, Hattori, Daniels & Adrian, LLP (57) ABSTRACT

An underwater traveling vehicle includes: a vehicle body 2; an endless track means 3 which is rotatably mounted to the vehicle body 2; a drive means which is provided in the vehicle body 2 so as to drive the endless track means 3; and a thruster 4 which is provided in the vehicle body 2.

8 Claims, 8 Drawing Sheets

UNDERWATER TRAVELING VEHICLE

TECHNICAL FIELD

The present invention relates to an underwater traveling vehicle that is used for sea floor exploration, sea floor cable laying, or cleaning of sea floor or a tank bottom, etc., and travels on an endless track means.

BACKGROUND ART

Conventionally, for the purpose of always achieving rapid and stable surfacing without depending on the surrounding water pressure even at great depth, there is disclosed an underwater traveling device in which a propeller capable of changing the rotation direction is mounted to the body thereof provided with tires for traveling (PTL 1).

CITATION LIST

Patent Literature

[PTL 1] JP-A-9-58583

DISCLOSURE OF THE INVENTION

Problems to be Solved by the Invention

However, the water traveling device of PTL 1 targets at the comparatively shallow sea floor and aims at surfacing in a stable attitude and at surfacing at a predetermined position on the water, which have conventionally been difficult to achieve due to use of the tires.

Meanwhile, an ROV (remotely operated vehicle) for deep exploration needs to be light weight for a reduction in cable tension. Further, in a launcher/vehicle type ROV, the vehicle needs to have satisfactory mobility, so that a state close to neutral buoyancy is preferably maintained.

Figure 11:
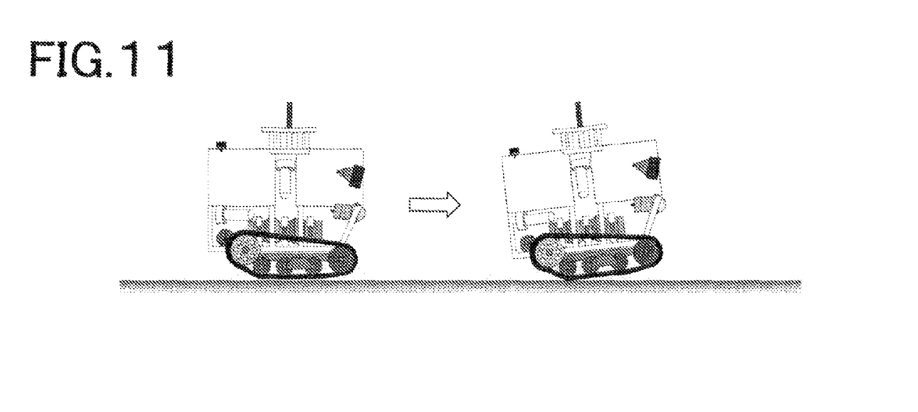
FIG. 11 is a view illustrating the behavior of the underwater traveling vehicle.
Figure 12:
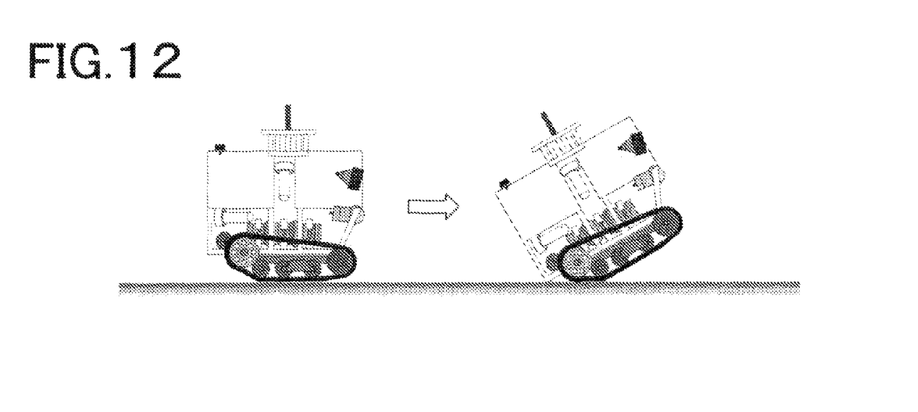
FIG. 12 is a view illustrating the behavior of the underwater traveling vehicle.

Assume that a crawler is adopted as a traveling method of the ROV and that the vehicle travels on the sea floor by means of the crawler. In this case, as illustrated in FIG. 11, when the vehicle has its own weight (weight in water) of as high as about 120 kg or more, although the vehicle front lifts up slightly at the start of traveling, the vehicle immediately assumes a horizontal attitude for stable traveling. However, as illustrated in FIG. 12, when the vehicle has own its weight (weight in water) as low as about 90 kg, the vehicle body is significantly inclined by the influence of a crawler's driving force and fluid force depending on the positional relationship between the center of gravity and center of buoyancy, making it difficult for the vehicle to continue traveling. For example, in the case of a rear-wheel-drive system, if the vehicle is light weight, the vehicle front lifts up when the vehicle travels in the forward direction, which may result in a rollover. Further, when the vehicle travels in the backward direction, the vehicle front lifts up at the time of stoppage, which may also result in a rollover.

The present invention has been made to solve the above problem, and an object thereof is to provide an underwater traveling vehicle having a simple structure and a reduced weight and capable of increasing traveling performance and reducing uplift behavior.

Means for Solving the Problems

To attain the above object, according to the present invention, there is provided an underwater traveling vehicle characterized by including: a vehicle body; an endless track means which is rotatably mounted to the vehicle body; a drive means which is provided in the vehicle body so as to drive the endless track means; and a thruster which is provided in the vehicle body.

The underwater traveling vehicle further includes: a storage means for storing the initial state of the vehicle body on land; a measurement means for measuring the state of the vehicle body in water; and a control means for controlling the thrust force or drive direction of the thruster based on outputs received from the storage means and the measurement means.

The storage means stores the weight, initial gravity center position, and initial buoyancy center position of the underwater traveling vehicle.

The measurement means measures the gravity center position and buoyancy center position of the underwater traveling vehicle in water.

The control means has a determination means for determining whether the attitude of the vehicle body is stable or not based on outputs received from the storage means and the measurement means.

The storage means stores thresholds defining, respectively for each weight of the underwater traveling vehicle, the boundary between stable and unstable regions based on the relationship between the gravity center position and buoyancy center position, and the determination means compares the gravity center and buoyancy center positions of the underwater traveling vehicle in water with the thresholds, respectively, to determine whether the attitude of the vehicle body is stable or not.

The control means operates in a continuous manner during the traveling of the underwater traveling vehicle.

Advantageous Effects of the Invention

The underwater traveling vehicle according to the present invention has the vehicle body, endless track means which is rotatably mounted to the vehicle body, drive means which is provided in the vehicle body so as to drive the endless track means, and thruster which is provided in the vehicle body. By actuating the thruster to add weight to the underwater traveling vehicle so as to change the apparent weight and gravity center position of the underwater traveling vehicle, it is possible to achieve reduced weight with a simple structure and to reduce uplift behavior to thereby increase traveling performance.

The underwater traveling vehicle further has the storage means for storing the initial state of the vehicle body on land, measurement means for measuring the state of the vehicle body in water, and control means for controlling the thrust force and drive direction of the thruster based on outputs received from the storage means and measurement means. With this configuration, it is possible to further reduce the uplift behavior, resulting in a further increase in the traveling performance.

The storage means stores the weight, initial gravity center position, and initial buoyancy center position of the underwater traveling vehicle, so that the initial state can be correctly applied in the control time.

Further, the measurement means measures the gravity center position and buoyancy center position of the underwater traveling vehicle in water, which can improve the accuracy in the control time.

Further, the control means has the determination means for determining whether the attitude of the vehicle body is stable or not based on outputs received from the storage means and the measurement means, which makes it possible to grasp the state of the vehicle body in water.

Further, the storage means stores the thresholds defining, respectively for each weight of the underwater traveling vehicle, the boundary between stable and unstable regions based on the relationship between the gravity center position and buoyancy center position, and the determination means compares the gravity center and buoyancy center positions of the underwater traveling vehicle in water with the thresholds, respectively, to thereby determine whether the attitude of the vehicle body is stable or not. With this configuration, it is possible to quickly grasp the state of the vehicle body in water.

EXPLANATION OF REFERENCE SYMBOLS

| | |
|---|---|
| 1: | Underwater traveling vehicle |
| 2: | Vehicle body |
| 3: | Crawler (endless track means) |
| 4: | Thruster |
| 5: | Attitude sensor (measurement means) |
| 6: | Camera |
| 7: | Light |
| 8: | Buoyant body |
| 9: | Cable |
| 10: | Storage means |
| 11: | Control means |
| 12: | Determination means |

BEST MODE FOR CARRYING OUT THE INVENTION

Figure 1:
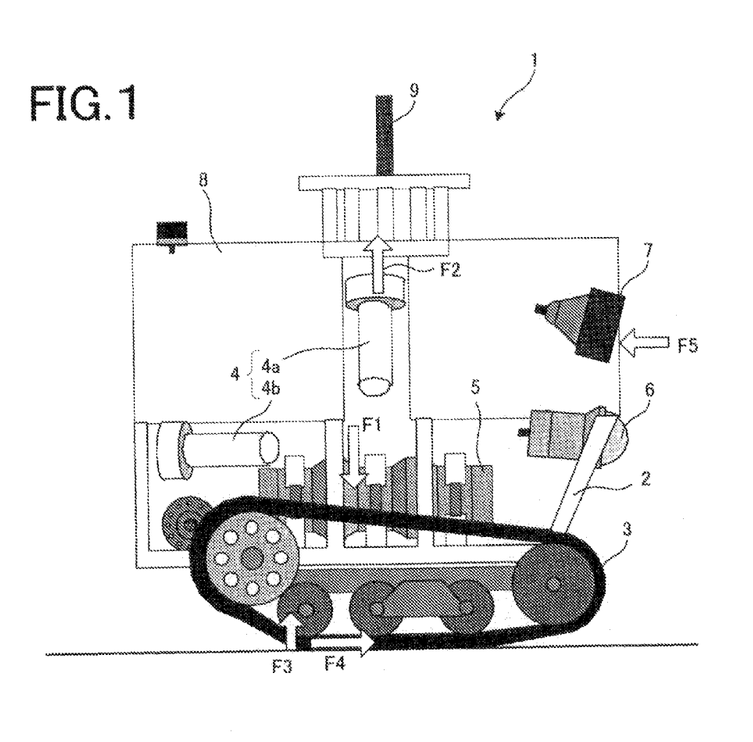
FIG. 1 is a view illustrating an underwater traveling vehicle according to the present invention.

An embodiment of the present invention will be described below with reference to the accompanying drawings. FIG. 1 is a view schematically illustrating an underwater traveling vehicle according to the present embodiment. In FIG. 1, reference numeral 1 denotes an underwater traveling vehicle, 2 denotes vehicle body, 3 denotes a crawler as an endless track means, 4 denotes a thruster, 5 denotes an attitude sensor as a measurement means, 6 denotes a camera, 7 denotes a light, 8 denotes a buoyant body, and 9 denotes a cable.

The underwater traveling vehicle 1 has the vehicle body 2 to which the crawler 3 is rotatably mounted and drives the crawler 3 by means of a not-illustrated drive means such as a motor to thereby move on the sea floor, etc.

The thruster 4 is provided in the vehicle body 2 so as to change the gravity center position or buoyancy center position of the underwater traveling vehicle 1. In the present embodiment, a first thruster 4a and a second thruster 4b are provided. The first thruster 4a is provided so as to extend in the vertical direction as a first direction, and the second thruster 4b is provided so as to extend in the horizontal direction as a second direction. By controlling the thrust force of each of the first and second thrusters 4a and 4b, the propulsion direction can be set.

The number of the thrusters 4 need not be more than one. By mounting the thruster 4 so as to be pivoted with respect to the vehicle body 2 and changing the pivot angle, the propulsion direction can be changed. Further, the thruster 4 is preferably mounted so as to be moved close to or away from the vehicle body 2.

The attitude sensor 5 measures the state of the vehicle body 2, such as inclination angle or acceleration, in water. In the case where an actuating member, such as a manipulator, having influence on the vehicle body 2 is provided, a state of the actuating member is preferably measured.

The camera 6 detects the state of the surrounding area of the underwater traveling vehicle 1. In the case where, for example, sea floor exploration, sea floor cable laying, or cleaning of sea floor or a tank bottom is conducted, the camera 6 is used to photograph the state of the surrounding area, and a signal corresponding to the photographed image is transmitted to an operator on the water. The light 7 has a role of illuminating a location to be photographed by the camera 6.

The buoyant body 8 is configured to be expandable or contractible so as to control the buoyancy of the underwater traveling vehicle 1 and is mainly used when the underwater traveling vehicle 1 is picked up on the water. The cable 9 connects a ship, etc., on the sea and underwater traveling vehicle 1, through which electric power and various kinds of signals are exchanged.

In water, various forces such as weight F1, buoyancy F2, normal force F3, propulsion force F4, and fluid resistance F5 act on the underwater traveling vehicle 1 having the above configuration.

Figure 2:
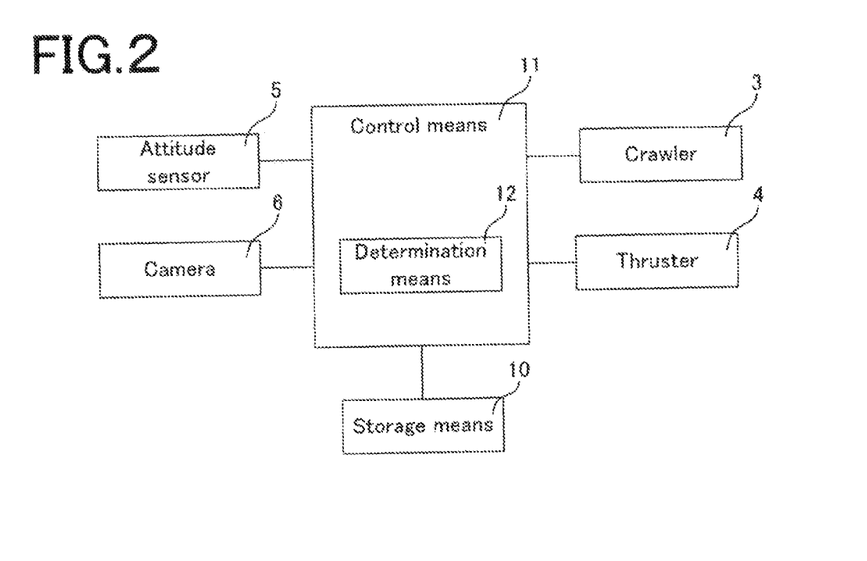
FIG. 2 is a functional block diagram of the underwater traveling vehicle.

FIG. 2 is a block diagram of the underwater traveling vehicle 1.

The attitude sensor 5 and camera 6 each measure the state of the vehicle body 2 in water. In particular, the attitude sensor 5 and camera 6 each preferably measure the gravity center position and buoyancy center position of the underwater traveling vehicle 1 in water.

A storage means 10 stores the initial state of the vehicle body on land. In particular, the storage means 10 preferably store the weight F1, initial gravity center position and initial buoyancy position of the underwater traveling vehicle.

A control means 11 controls the thrust force and drive direction of the thruster 4 based on outputs received from the attitude sensor 5 and camera 6. Further, the control means 11 has a determination means 12 for determining whether the attitude of the vehicle body 2 is stable or not based on outputs received from the storage means 10, attitude sensor 5, and camera 6.

Figure 3:
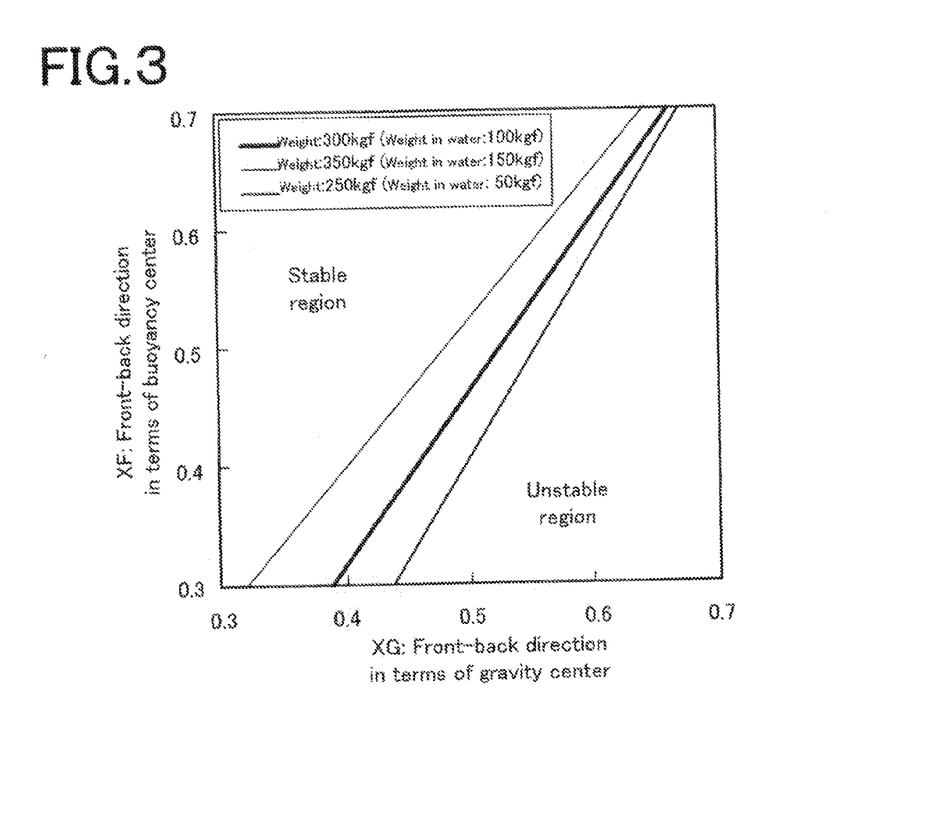
FIG. 3 is a view illustrating stable and unstable regions of the underwater traveling vehicle.

Further, as illustrated in FIG. 3, the storage means 10 preferably stores thresholds A, B, and C defining, respectively for each weight F1 of the underwater traveling vehicle 1, the boundary between stable and unstable regions based on the relationship between the gravity center position and buoyancy center position, and the determination means 12 preferably compares the gravity center and buoyancy center positions of the underwater traveling vehicle 1 in water with the thresholds A, B, and C, respectively, to thereby determine whether the attitude of the vehicle body is stable or not. Although three thresholds are used in the present embodiment, the number of thresholds is not limited to three but may arbitrarily set depending on the rotation speed or rotation direction of a thruster gear.

For example, a solid line in FIG. 3 represents the threshold A in the case where the weight F1 of the underwater traveling vehicle 1 is 300 kgf (weight in water is 100 kgf). Similarly, a broken line in FIG. 3 represents the threshold B in the case where the weight F1 of the underwater traveling vehicle 1 is 350 kgf (weight in water is 150 kgf), and a dashed-and-dotted line in FIG. 3 represents the threshold C in the case where the weight F1 of the underwater traveling vehicle 1 is 250 kgf (weight in water is 50 kgf).

A case where a given point corresponding to the relationship between the front-back direction in terms of gravity center (horizontal axis) and front-back direction in terms of buoyancy center (vertical axis) is positioned on the left side of each of the thresholds A, B, and C is determined as "stable" and a case where the given point is positioned on the right side of each of the thresholds A, B, and C is determined as "unstable".

Figure 4:
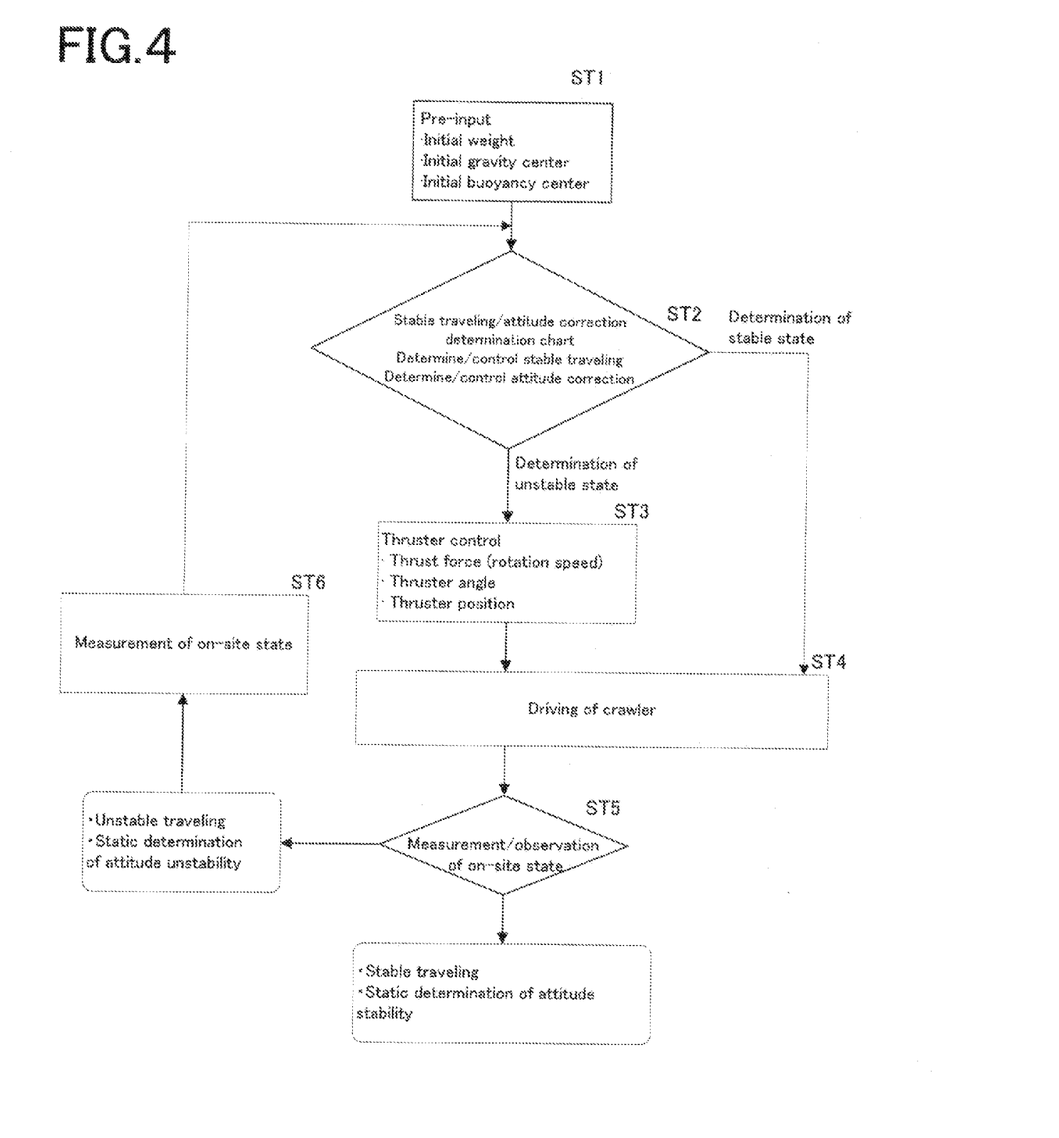
FIG. 4 is a control flowchart of the underwater traveling vehicle.

FIG. 4 is a control flowchart of the underwater traveling vehicle 1.

In step 1, before the start of operation in water, the initial weight, initial gravity center, and initial buoyancy center are stored in the storage means 10 (ST1).

In step 2, the determination means 12 compares the gravity center and buoyancy center positions of the underwater traveling vehicle 1 stored in the storage means 10 and the threshold in the stable traveling/attitude correction determination chart as illustrated in FIG. 3 which defines, for each weight F1 of the underwater traveling vehicle 1, the boundary between stable and unstable regions to determine whether the attitude of the vehicle body is stable or not (ST2).

When it is determined in step 2 that the attitude of the vehicle body is unstable, the thruster 4 is controlled in step 3 (ST3). More specifically, the control means 11 controls the thrust force, thruster angle, and thruster position, etc., to control the drive direction of the thruster 4. Subsequently, in step 4, the crawler 3 is driven so as to make the underwater traveling vehicle 1 travel (ST4).

When it is determined in step 2 that the attitude of the vehicle body is not unstable but stable, the crawler 3 is driven in step 4 so as to make the underwater traveling vehicle 1 travel (ST4).

In step S5, the on-site state of the underwater traveling vehicle 1 in water is measured/observed using the attitude sensor 5, and then the determination means 12 determines, based on the fluid resistance F5 generated due to the traveling of the underwater traveling vehicle 1, resistance generated by accessories such as a manipulator, or the like, whether the gravity and buoyancy center positions are not changed to allow the stable traveling state to be maintained (ST5).

When it is determined that in step 5 that the traveling state of the underwater traveling vehicle 1 is not stable but unstable, the attitude sensor 5 or the like is used to measure the state of the surrounding area of the underwater traveling vehicle 1 in step 6 (ST6), and the flow returns to step 2.

When it is determined in step 5 that the traveling state of the underwater traveling vehicle 1 is stable, the control means 11 continues control operation while performing observation and acquiring various data.

Figure 5:
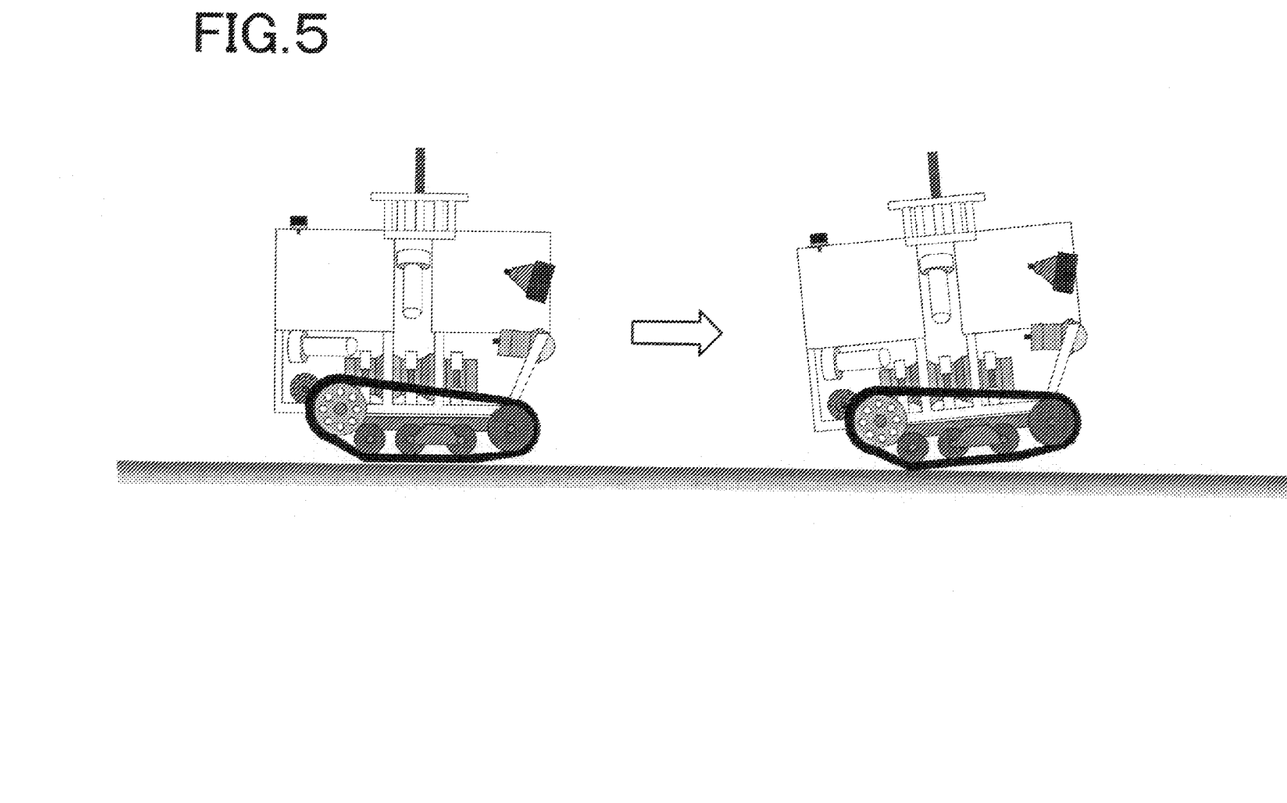
FIG. 5 is a view illustrating the behavior of the underwater traveling vehicle.

Next, an example of the behavior of the underwater traveling vehicle 1 in an experiment carried out for the underwater traveling vehicle 1 will be described. FIG. 5 is a view illustrating the behavior of the underwater traveling vehicle 1.

When the control using the thruster as described in the present embodiment is executed, the following result was obtained. That is, as in the case (FIG. 11) of the underwater traveling vehicle 1 having its own weight (weight in water) of as high as about 120 kg or more, the underwater traveling vehicle 1 having own its weight (weight in water) as low as about 90 kg as shown in FIG. 5 can assume a horizontal attitude for stable traveling immediately after the start of traveling although the vehicle front lifts up slightly at the start of traveling.

Next, detailed experiments carried out using the underwater traveling vehicle 1 of the present embodiment will be described.

Figure 6:
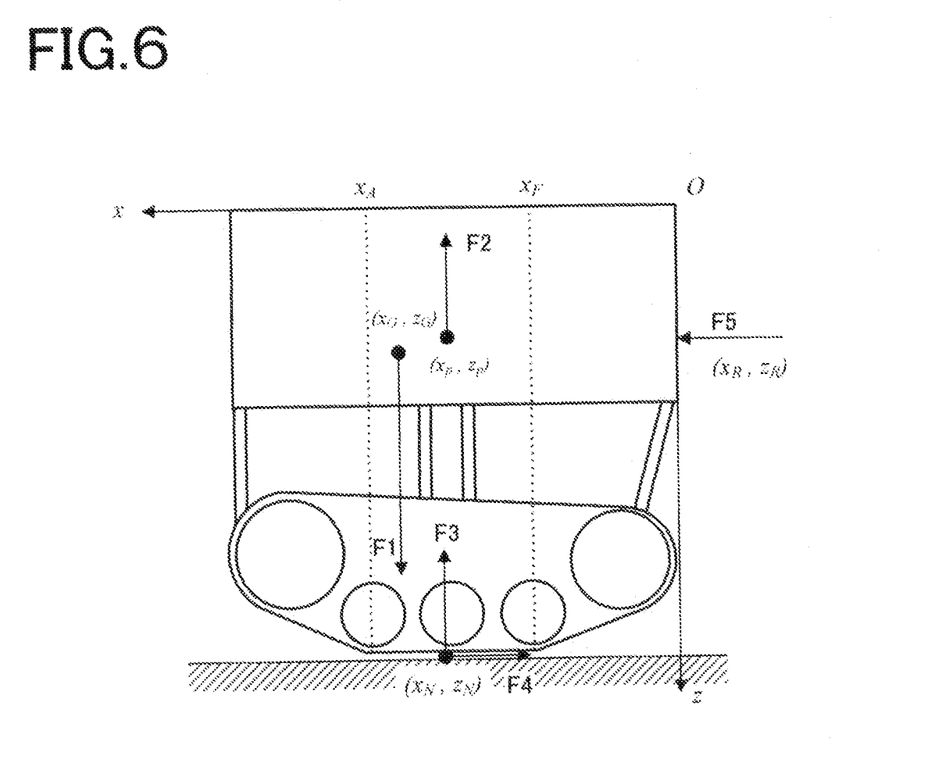
FIG. 6 is a view illustrating forces acting on the underwater traveling vehicle and the operating points thereof.

FIG. 6 illustrates the forces (weight F1, buoyancy F2, normal force F3, propulsion force F4, and fluid resistance F5) acting on the underwater traveling vehicle 1 and the operating points thereof. As illustrated in FIG. 6, in a coordinate representing the positions of the operating points, the origin is set at the upper end in the forward traveling direction of the underwater traveling vehicle 1, x-axis is set in the opposite direction to the traveling direction, and z-axis is set in the downward direction.

The following Table 1 represents the specification of the underwater traveling vehicle 1.

TABLE 1

| Item | Characteristics |
| --- | --- |
| Dimension | 600 mm (length) |
|  | 717 mm (Entire width including crawler) |
|  | 540 mm (From lower end of crawler to upper end of cover) |
| Thruster | 48 W motor with encoder |
|  | Installation position is changeable from initial position |
| Crawler | 48 W motor with encoder |
| Weight | 34.0 kgf (333.2 N) |
| Buoyancy | 17.9 kgf (175.4 N) |

The thrust force is measured in association with input voltage and motor rotation speed and is 9.0 N at a rated voltage.

The underwater traveling vehicle 1 is made to travel in a water tank. The water tank has a length of 40 m, a width of 4 m, and a depth of 2 m. The behavior of the underwater traveling vehicle 1 in the water tank can be observed from above and through observation windows formed in the side wall of the water tank. The attitude of the underwater traveling vehicle 1 can be obtained from a mounted gyroscope. The experiment was carried out by changing the number of block members that give buoyancy F2 so as to change buoyancy F2.

Figure 7:
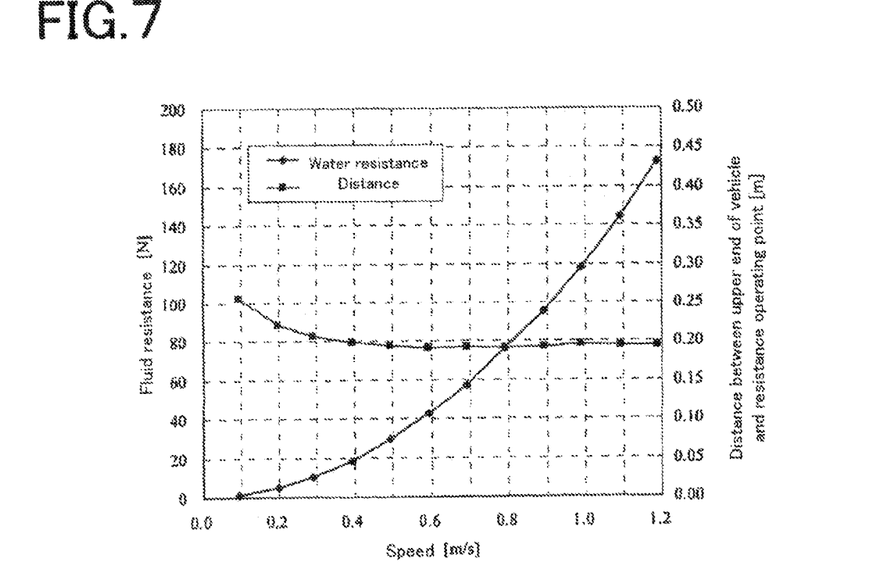
FIG. 7 is a graph illustrating the resistance of water and position of the operating point of the resistance, which are obtained in a towing experiment.

Next, a resistance measurement test will be described. FIG. 7 is a graph illustrating resistance F5 of water and position $Z_R$ of the operating point of resistance F5 in z-direction, which are obtained in a towing experiment. The resistance F5 of water and position $Z_R$ of the operating point of resistance F5 are parameters representing the stable traveling characteristics. As illustrated in FIG. 7, as the towing speed corresponding to the traveling speed is increased, the resistance F5 of the fluid is increased in proportion to the square of the speed. Therefore, the side of the underwater traveling vehicle 1 opposite to the side on which the underwater traveling vehicle 1 is towed tends to lift up. On the other hand, the position $Z_R$ of the operating point becomes constant when the speed exceeds a given value.

The following Table 2 represents the traveling behavior of the underwater traveling vehicle 1 in various specifications.

TABLE 2

| Case | Weight (kgf) | Buoyancy (kgf) | Gravity center (mm) | Buoyancy center (mm) | State (without thruster) | State (with thruster) |
|---|---|---|---|---|---|---|
| 1 | 34.5 | 18.6 | 285.6 | 308.3 | Stable | — |
| 2 | 34.5 | 20.6 | 285.6 | 280.1 | Stable | — |
| 3 | 34.5 | 22.6 | 285.6 | 306.8 | Stable | — |
| 4 | 34.5 | 24.6 | 285.6 | 283.3 | Stable | — |
| 5 | 34.5 | 26.6 | 285.6 | 305.3 | Stable | — |
| 6 | 34.5 | 28.6 | 285.6 | 285.1 | Uplift | Stable |
| 7 | 34.5 | 30.6 | 285.6 | 305.9 | Uplift | Stable |

The underwater traveling vehicle 1 was made to travel in the forward direction at a motor speed of 3000 rpm corresponding to a traveling speed of about 0.3 m/s. In such an experiment carried out under conditions of low speed and low acceleration, dynamic influence observed at the start of traveling is expected to be small.

As is clear from Cases 1 to 5 of Table 2, when buoyancy F2 is smaller than a predetermined value, the underwater traveling vehicle 1 can maintain the horizontal attitude and thus can stably travel.

Figure 8:
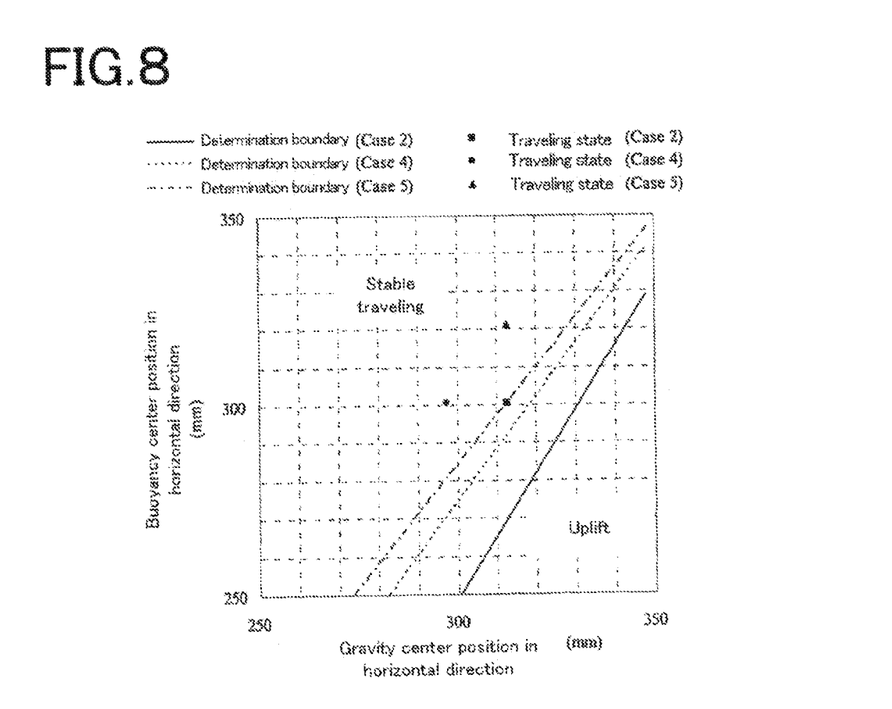
FIG. 8 is a graph obtained by determining the traveling state of the underwater traveling vehicle in Cases 2, 4, and 5 of the present experiment where the underwater traveling vehicle stably traveled.

FIG. 8 is a graph obtained by determining the traveling state of the underwater traveling vehicle 1 in Cases 2, 4, and 5 of the present experiment where the underwater traveling vehicle 1 stably traveled. In this graph, the horizontal axis represents gravity center position $X_G$ in x-direction, and vertical axis represents buoyancy center position $X_B$ in x-direction.

As illustrated in the graph of FIG. 8, in Cases 2, 4, and 5, the relation between the gravity center position $X_G$ of the underwater traveling vehicle 1 in x-direction and buoyancy center position $X_B$ in x-direction exists in the stable region.

However, as is clear from Table 2, without the thruster, when the buoyancy F2 is higher than a predetermined value, one side of the underwater traveling vehicle 1 lifts up even when the buoyancy center position falls within the same range as in other cases, as in Cases 6 and 7.

When the underwater traveling vehicle 1 has the thruster 4, the weight F1 is virtually increased, and the gravity center position ($X_G$, $Z_G$) can be changed. As a result, the underwater traveling vehicle 1 can maintain the horizontal attitude and thus can stably travel.

Figure 9:
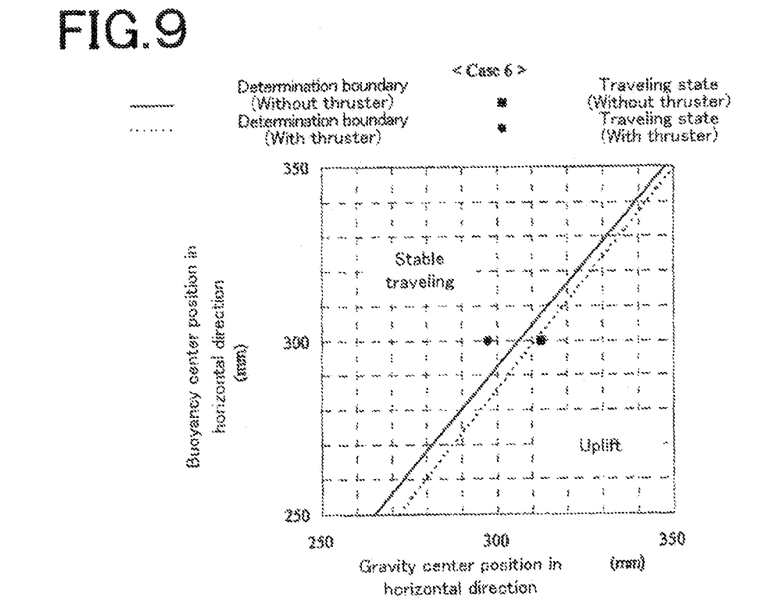
FIG. 9 is a graph obtained by determining the traveling state of the underwater traveling vehicle in the cases where the thruster is provided and not provided in Case 6.

FIG. 9 is a graph obtained by determining the traveling state of the underwater traveling vehicle 1 in the cases where the thruster 4 is provided and not provided in Case 6. As illustrated in FIG. 9, in the case where the thruster 4 is not provided in Case 6, the traveling state of the underwater traveling vehicle 1 is determined to be in the unstable region, while in the case where the thruster 4 is provided, the traveling state of the underwater traveling vehicle 1 is determined to be in the stable region.

Figure 10:
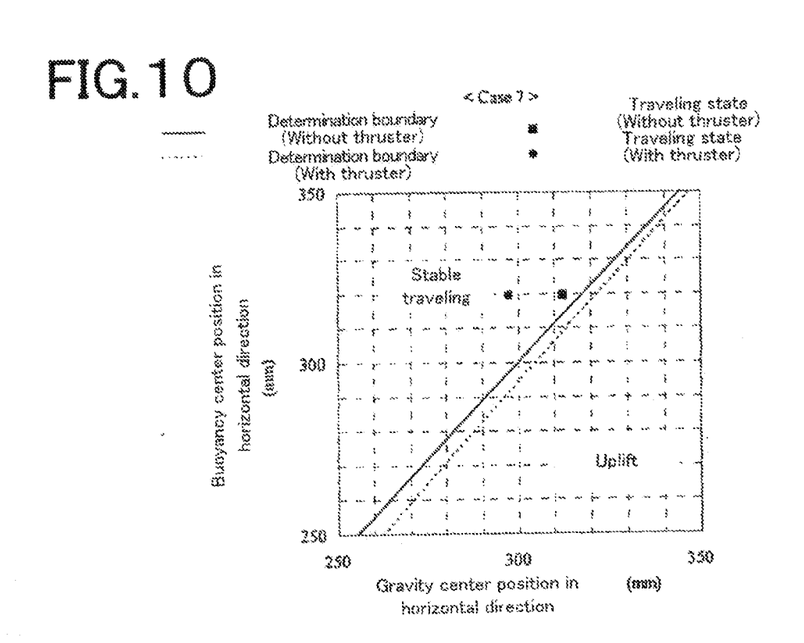
FIG. 10 is a graph obtained by determining the traveling state of the underwater traveling vehicle in the cases where the thruster is provided and not provided in Case 7.

FIG. 10 is a graph obtained by determining the traveling state of the underwater traveling vehicle 1 in the cases where the thruster 4 is provided and not provided in Case 7. As illustrated in FIG. 10, in Case 7, the traveling state of the underwater traveling vehicle 1 should be in the stable region both in the cases where the thruster 4 is provided and not provided. Actually, however, as is clear from Table 2, in the case where the thruster 4 is not provided, one side of the underwater traveling vehicle 1 lifted up and thus the traveling state became unstable. It is believed that the uplift is caused by insufficient measurement accuracy of the buoyancy center and gravity center. However, as illustrated in FIG. 10, the traveling state in the case where the thruster 4 is provided is in a more stable state than in the case where the thruster 4 is not provided, and the fact remains that providing the thruster 4 is an effective method for changing the gravity center and achieving stable traveling.

Next, an experiment was carried out with the rotation speed of a crawler motor set to 5000 rpm. The following Table 3 represents the traveling behavior of the underwater traveling vehicle 1 in the same specifications as Table 2.

TABLE 3

| Case | Weight (kgf) | Buoyancy (kgf) | Gravity center (mm) | Buoyancy center (mm) | State (without thruster) | State (with thruster) |
|---|---|---|---|---|---|---|
| 1 | 34.5 | 18.6 | 285.6 | 308.3 | Stable | — |
| 2 | 34.5 | 20.6 | 285.6 | 280.1 | Uplift | Stable |
| 3 | 34.5 | 22.6 | 285.6 | 306.8 | Uplift | Stable |
| 4 | 34.5 | 24.6 | 285.6 | 283.3 | Uplift | Uplift |
| 5 | 34.5 | 26.6 | 285.6 | 305.3 | Uplift | Stable |
| 6 | 34.5 | 28.6 | 285.6 | 285.1 | Uplift | Uplift |
| 7 | 34.5 | 30.7 | 285.6 | 305.9 | Uplift | Stable |

Thus, it has been found that even in such an experiment carried out under conditions of high speed and high acceleration, the traveling state in the case where the thruster 4 is provided is in a more stable traveling state than in the case where the thruster 4 is not provided and that providing the thruster 4 is an effective method for changing the gravity center and achieving stable traveling.

As described above, the underwater traveling vehicle 1 according to the present invention has the vehicle body 2, crawler 3 rotatably mounted to the vehicle body 2, drive means provided in the vehicle body 2 so as to drive the crawler 3, and thruster 4 provided in the vehicle body 2. By changing the gravity center position of the underwater traveling vehicle 1 using the thruster 4, it is possible to achieve reduced weight with a simple structure and to reduce uplift behavior to thereby increase traveling performance.

The underwater traveling vehicle 1 further has the storage means 10 for storing the initial state of the vehicle body 2 on land, attitude sensor 5 for measuring the state of the vehicle body 2 in water, and control means 11 for controlling the thrust force and drive direction of the thruster 4 based on outputs received from the storage means 10 and the attitude sensor 5. With this configuration, it is possible to further reduce the uplift behavior, resulting in a further increase in the traveling performance.

The storage means 10 stores the weight, initial gravity center position, and initial buoyancy center position of the underwater traveling vehicle 1, so that the initial state can be correctly applied in the control time.

Further, the attitude sensor 5 measures the gravity center position and buoyancy center position of the underwater traveling vehicle 1 in water, which can improve the accuracy in the control time.

Further, the control means 11 has the determination means 12 for determining whether the attitude of the vehicle body 2 is stable or not based on outputs received from the storage means 10 and attitude sensor 5, which makes it possible to grasp the state of the vehicle body 2 in water.

Further, the storage means 10 stores the thresholds defining, respectively for each weight of the underwater traveling vehicle 1, the boundary between stable and unstable regions based on the relationship between the gravity center position and buoyancy center position, and the determination means 12 compares the gravity center and buoyancy center positions of the underwater traveling vehicle 1 in water with the thresholds, respectively, to thereby determine whether the attitude of the vehicle body 2 is stable or not. With this configuration, it is possible to quickly grasp the state of the vehicle body 2 in water.

Further, the control means operates in a continuous manner during the traveling of the underwater traveling vehicle. Thus, even if the traveling state becomes unstable after stable traveling state has been once achieved, it is possible to quickly grasp the state of the vehicle body 2 for control.

The invention claimed is:

1. An underwater traveling vehicle characterized by comprising:
    a vehicle body;
    an endless track which is rotatably mounted to the vehicle body;
    a drive which is provided in the vehicle body so as to drive the endless track; and
    a thruster which is provided in the vehicle body;
    a storage for storing the initial state of the vehicle body on land;
    a measurement device for measuring the state of the vehicle body in water; and
    a controller for controlling the thrust force or drive direction of the thruster based on outputs received from the storage and the measurement unit during traveling of the vehicle using the endless track.

2. The underwater traveling vehicle according to claim 1, characterized in that the storage stores the weight, initial gravity center position, and initial buoyancy center position of the underwater traveling vehicle.

3. The underwater traveling vehicle according to claim 1, characterized in that the measurement device measures the gravity center position and buoyancy center position of the underwater traveling vehicle in water.

4. The underwater traveling vehicle according to claim 1, characterized in that the controller has a determination portion configured to determine whether the attitude of the vehicle body is stable or not based on outputs received from the storage and the measurement device.

5. An underwater traveling vehicle characterized by comprising:
    a vehicle body;
    an endless track which is rotatably mounted to the vehicle body;
    a drive which is provided in the vehicle body so as to drive the endless track; and
    a thruster which is provided in the vehicle body;
    a storage for storing the initial state of the vehicle body on land;
    a measurement device for measuring the state of the vehicle body in water; and
    a controller for controlling the thrust force or drive direction of the thruster based on outputs received from the storage and the measurement unit; and
    characterized in that the controller has a determination portion configured to determine whether the attitude of the vehicle body is stable or not based on outputs received from the storage and the measurement device; and
    characterized in that the storage stores thresholds defining, respectively for each weight of the underwater traveling vehicle, the boundary between stable and unstable regions based on the relationship between the gravity center position and buoyancy center position, and the determination portion compares the gravity center and buoyancy center positions of the underwater traveling vehicle in water with the thresholds, respectively, to determine whether the attitude of the vehicle body is stable or not.

6. The underwater traveling vehicle according to claim 1, characterized in that the controller operates in a continuous manner during the traveling of the underwater traveling vehicle.

7. An underwater traveling vehicle characterized by comprising:
    a vehicle body;
    an endless track which is rotatably mounted to the vehicle body;
    a drive which is provided in the vehicle body so as to drive the endless track; and
    a thruster which is provided in the vehicle body;
    a storage for storing the initial state of the vehicle body on land;
    a measurement device for measuring the state of the vehicle body in water; and
    a controller for controlling the thrust force or drive direction of the thruster based on outputs received from the storage and the measurement unit; and
    wherein said thruster is configured to transmit a propulsion thrust force in a propulsion direction that is non-parallel to a traveling direction of the vehicle and wherein said vehicle is driven in said traveling direction via said drive and said endless track.

8. An underwater traveling vehicle characterized by comprising:
    a vehicle body;
    endless track means which is rotatably mounted to the vehicle body;
    drive means which is provided in the vehicle body so as to drive the endless track means; and
    a thruster which is provided in the vehicle body,
    storage means for storing the initial state of the vehicle body on land;
    measurement means for measuring the state of the vehicle body in water; and
    control means for controlling the thrust force or drive direction of the thruster based on outputs received from the storage means and the measurement means.
    characterized in that the control means has determination means for determining whether the attitude of the vehicle body is stable or not based on outputs received from the storage means and the measurement means;
    characterized in that the storage means stores thresholds defining, respectively for each weight of the underwater traveling vehicle, the boundary between stable and unstable regions based on the relationship between the gravity center position and buoyancy center position, and the determination means compares the gravity center and buoyancy center positions of the underwater traveling vehicle in water with the thresholds, respectively, to determine whether the attitude of the vehicle body is stable or not.

* * * * *